United States Patent Office

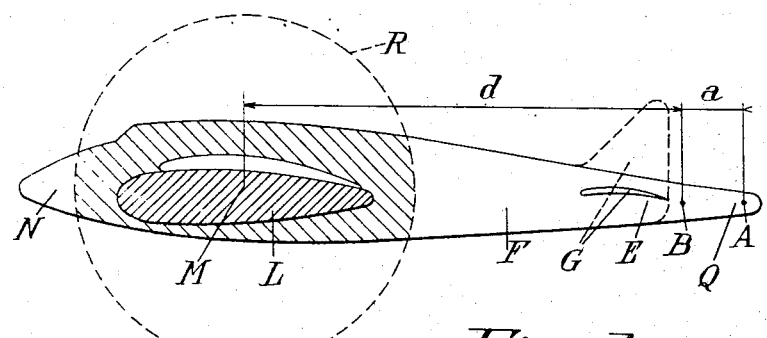
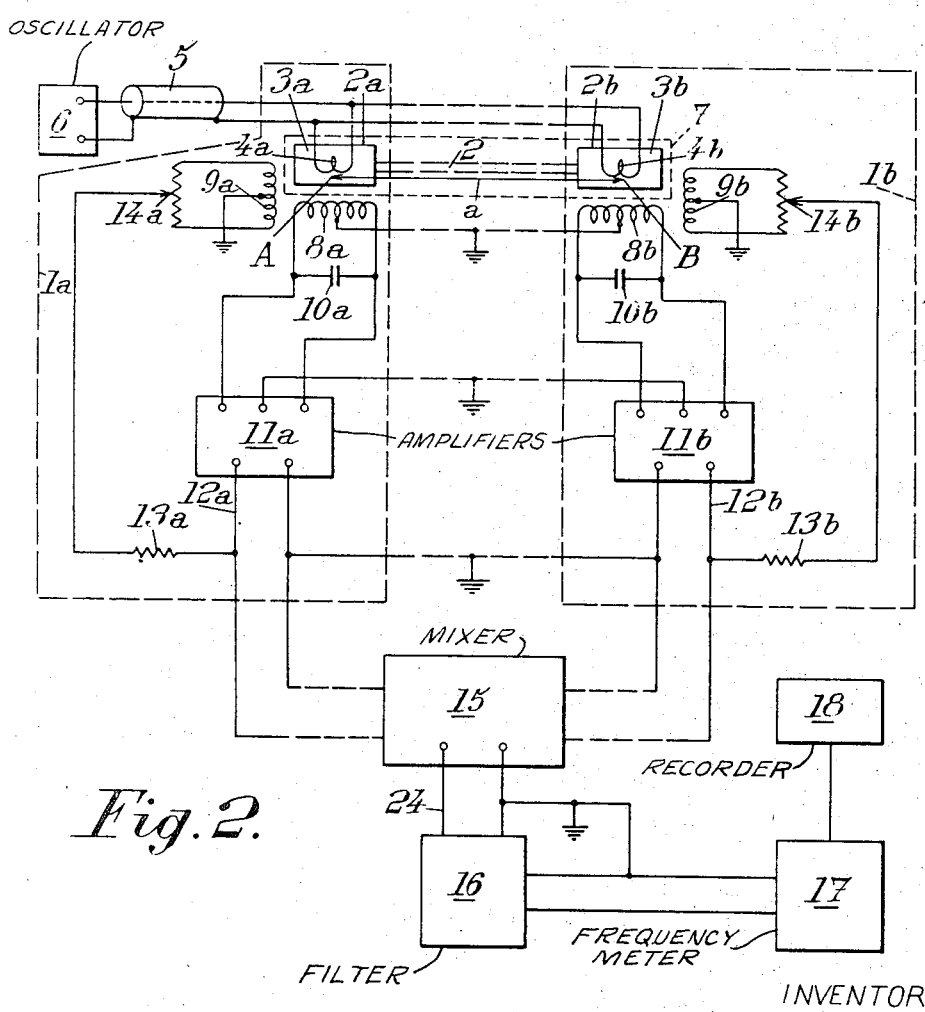

3,403,326
Patented Sept. 24, 1968

3,403,326
MAGNETIC RESONANCE MAGNETOMETERS
Antoine Salvi, Fontaine, and René Besson, Meylan, France, assignors to Commissariat à l'Energie Atomique, Paris, France, an organization of France
Filed June 27, 1966, Ser. No. 560,570
2 Claims. (Cl. 324—.5)

The present invention relates to magnetic resonance magnetometers.

This application is concerned with improvements in the invention set forth in the prior U.S. application No. 417,061, filed Dec. 9, 1964 and assigned to the same assignee as the present application.

This invention is more particularly concerned with magnetometers for measuring the intensity of magnetic fields, in particular of weak magnetic fields (lower than 1 gauss) and their variations, on board of a movable body (aircraft, space vehicle and the like).

At the present time there are different types of known magnetometers bringing magnetic resonance into play. Such devices are based upon the measurement of the precession frequency, called Larmor frequency, of the magnetic moment, generally the nuclear magnetic moment of a subatomic particle, generally an atomic nucleus and more particularly a proton, in the magnetic field to be measured, this frequency being proportional to the intensity of the magnetic field in which said subatomic particle is placed.

Designating by H the intensity in gauss of the magnetic field to be measured, in which the subatomic particle is placed, by $\gamma$ the gyromagnetic ratio of the particle (the existence of a well determined $\gamma$ ratio meaning that the kinetic momentum or spin and therefore the magnetic moment of the particle are different from zero) and by $F_0$ the precession or Larmor frequency in cycles per second there is the relation:

$$2\pi F_0 = \gamma . H \quad (1)$$

The gyromagnetic ratio $\gamma$ expressed in gauss/sec., is known with a very great precision for many atomic nuclei. In particular the gyromagnetic ratio of the proton in deoxygenated water is known with a precision of $10^{-6}$ and it is equal to 26751.3 gauss/sec.

The electromagnetic radiation of a frequency equal to F is circularly polarized, the resonance appearing as a rotation of the total magnetic moment about the direction of the magnetic field. The electromagnetic radiation rotary field is detected by means of at least one coil, disposed around the subatomic particles, in which coil the rotary field produces a reciprocating voltage. It follows that, if the coil is located on board of a movable body having an instantaneous angular velocity $\omega$ of rotation about the direction of the magnetic field, the coil is itself driven at this angular velocity and the frequency of the reciprocating voltage which is created in said coil by magnetic resonance will no longer be given by the above Formula 1, which corresponds to the absolute rotation of the total magnetic moment with respect to a fixed reference system, but will correspond to the relative rotation of this moment with respect to a reference system fixed with respect to the movable body and therefore to the coil. In other words, according to the law of composition of angular velocities, and calling $f$ the frequency in the case of a rotation at the instantaneous velocity $\omega$, the above formula will become $$2\pi f = \gamma H - \omega \quad (2)$$

If it is desired, in particular, to measure with a high precision a weak magnetic field such as the earth magnetic field, and its variations, with a magnetic resonance magnetometer of the prior type, the measurement is in-accurate, because it is based on Formula 1 and neglects the influence of $\omega$. Now $\omega$ can take values which are relatively important and are very variable when the measurement is made on board of an aircraft, or other movable body capable of rotating about the axis of the magnetic field. It is very difficult, if not impossible, to make the correction corresponding to $\omega$, due to the fact that the value of $\omega$ is very variable, so that very disturbing inaccuracies in the measurement of H and chiefly of the variations thereof occur.

Studies relating to magnetism and geophysical researches concerning mineral substances based upon the variations of H therefore risk of being inaccurate if the influence of $\omega$ is neglected.

The above mentioned prior application described a magnetometer obviating the above mentioned drawbacks, this magnetometer comprising subatomic particles having a non zero magnetic moment and a non zero kinetic momentum, means capable of exciting and detecting the magnetic resonance thereof, and means for measuring the frequency of the signal thus detected, said magnetometer being essentially characterized in that, on the one hand, the particles the resonance of which is detected are of two kinds having different values for the ratio of said moment and said momentum and, on the other hand, the magnetometer includes means for measuring the algebraic difference of the two corresponding magnetic resonance frequencies, each of these frequencies having the sign of the ratio of the corresponding magnetic moment and kinetic momentum, respectively.

As a matter of fact, if one calls $f'$ and $f''$, on the one hand, and $\gamma'$ and $\gamma''$, on the other hand, the values of $f$ and of $\gamma$ for the two kinds of particles, which are for instance constituted by protons for which $\gamma'$ is positive and fluorine nuclei for which $\gamma''$ is also positive but lower than $\gamma'$, relation (2) is as follows for the two nuclei:

$$2\pi f' = \gamma' H - \omega \quad (3)$$
$$2\pi f'' = \gamma'' H - \omega \quad (4)$$

If $f'''$ is the difference between $f'$ and $f''$, then:

$$2\pi f''' = 2\pi f' - 2\pi f'' = (\gamma' - \gamma'') H = GH \quad (5)$$

G being the difference $\gamma' - \gamma''$ and it being supposed that $\gamma'$ is greater than $\gamma''$. The values of $\gamma'$ and $\gamma''$ being known with a great precision, G is also known with a high precision.

Relation 5 therefore replaces relation 1, with the advantage that the frequency $f'''$ is strictly proportional to H even if the magnetometer is rotating with respect to the direcion of H with velocity $\omega$.

In the case where $\gamma'$ and $\gamma''$ are not of the same sign, $\gamma'$ being for instance positive and $\gamma''$ negative, relation 3 remains true, whereas relations 4 and 5 are replaced by the following relations:

$$2\pi f'' = \gamma' - \gamma''.H \quad (4a)$$
$$2\pi (f' + f'') = (\gamma' - \gamma'') H = GH \quad (5a)$$

G being in all cases the algebraic difference of the two gyromagnetic ratios.

As pairs of subatomic particles suitable for the present invention, the following may be cited:

protons and fluorine nuclei,
protons and phosphorus nuclei,
protons and helium 3 nuclei.

All these nuclei have positive gyromagnetic ratios, with the exception of helium 3, which has a negative gyromagnetic ratio.

It has also been indicated in the above mentioned prior application that, in the preferred embodiments (this is in particular true for the two first mentioned pairs), use is made of the method of dynamic polarization by electronic pumping disclosed in the U.S. patent application No. 725, 746 filed Apr. 1, 1958, now Patent No. 3,049,661, that is to say of liquid samples containing in solution in a solvent containing said nuclei (protons, fluorine nuclei, phosphorus nuclei), a paramagnetic radical comprising an unpaired electron, saturation of an electronic resonance line increasing the intensity of the nuclear signal.

As for each of the probes of the magnetometer, it is advantageously made in the first above mentioned prior application in the form of a spin oscillator described in the U.S. patent application No. 333,901 filed Dec. 27, 1963, now Patent No. 3,249,856.

In the first above mentioned prior patent application, both of the probes or measurement heads of the magnetometer were disposed side by side and rigid with each other.

Now it has been found that, by disposing the two probes no longer side by side but at some distance from each other, in particular one behind the other in the vertical plane of symmetry of the movable body, for instance an aircraft, by which they are carried, it is possible to compensate for the disturbances of measurement of the intensity of the earth magnetic field, due not only to the "gyroscopic effect" produced by a rotation of the aircraft but also to the "permanent" parasitic magnetic field produced by the permanent magnetizations of, and the currents supplied to, the apparatus by the aircraft, the intensity of this parasitic field varying from one point to the other of the aircraft.

The invention consists in choosing the respective positions of the two probes, the active substance of which comprise subatomic particles of different respective gyromagnetic ratios, in such manner that, in both of these two positions, there is substantially the same value for the product of the intensity of the permanent parasitic magnetic field by the gyromagnetic ratio of the particles of the probe that is located in this position.

The invention is more especially, but not exclusively concerned with magnetometers intended to measure the variations, on board of an aircraft, of the earth magnetic field that is to say with magnetovariometers.

A preferred embodiment of the present invention will be hereinafter described with reference to the appended drawings, given merely by way of example, and in which:

FIG. 1 shows, diagrammatically and in side elevation partly in section, an aircraft carrying a magnetometer according to the invention;

FIG. 2 shows a magnetometer provided with the improvements according to the invention.

Reference will first be made to FIG. 1 which diagrammatically shows an aircraft, with its nose N, its fuselage F, its wings L, its control surfaces G for the fuselage rear portion E and its tail end Q. It is known that most of the apparatus on board of the aircraft (engines, electric and electronic equipments, store compartments, tanks and so on) which imply a permanent magnetic compensation are included in a substantially spherical space R located near the front of the aircraft, the center of this space R coinciding substantially with the barycenter M of the magnetic masses of the aircraft. The apparatus in this space have a greater influence upon a measurement probe disposed at B at a distance $d$ from this barycenter M than upon a measurement probe located at A at a supplementary distance $a$ from barycenter M. In the example shown by the drawing, A is located in the tail end of the aircraft whereas B is located between said tail end and space R, these positions of A and B being, as a matter of fact, preferred positions for the two probes.

If the probes are disposed, as indicated, at A and B in accordance with relation 5, $$2\pi f' = (\gamma' - \gamma'')H$$

if H is the same at A and B. But if, as it is supposed, the intensity of the magnetic field at A and B comprises two terms, to wit a first common term $H_0$ equal to the earth magnetic field to be measured, which does not vary substantially between A and B, and a second term, $h_A$ at point A and $h_B$ at point B, due to the permanent magnetic disturbances created in the aircraft essentially by the circuits and other equipments of space R, relation 5 becomes $$2\pi f''' = \gamma'(H_0 + \epsilon h_A) - \gamma''(H_0 + \epsilon h_B) \quad (6)$$

wherein $\epsilon = \pm 1$ and it is supposed that $\gamma'$ is the gyromagnetic ratio of the atomic nuclei of the probe located at point A and $\gamma''$ is the gyromagnetic ratio of the atomic nuclei of the probe located at point B.

This relation 6 may also be written as follows:

$$2\pi f''' = (\gamma' - \gamma'')H_0 + \epsilon(\gamma' h_A - \gamma'' h_B) \quad (7)$$

Relation 7 comprises, with respect to relation 5 a corrective term $$\epsilon(\gamma' h_A - \gamma'' h_B)$$

According to the present invention, points A and B are chosen in such manner that this corrective term is zero that is to say that $$\gamma' h_A = \gamma'' h_B \quad (8)$$

In other words the positions of the two probes the active substances of which comprise subatomic particles (in particular atomic nuclei) of different gyromagnetic ratios, are chosen in such manner that, in each of these two positions, the product of the intensity of the permanent parasitic magnetic field by the gyromagnetic ratio of the particles (or nuclei) of the probe has substantially the same value.

It will first be noted that at the point A where the intensity of the parasitic magnetic field is weaker is disposed the probe the atomic nuclei of which have the higher gyromagnetic ratio.

Furthermore, advantageously although this is not quite necessary, the probe the gyromagnetic ratio of which is higher is located at the tail end (at point A) and the other probe in the vicinity of the first one, at B, at a distance $a$ small as compared with distance $d$, in such manner that $H_0$ is in fact the same at both of these points.

It will also be noted that, in order to obtain a correct operation of the magnetometer, it is necessary that ratio $h_A/h_B$ (which must remain equal to ratio $\gamma''/\gamma''$) remains constant, that is to say that the magnetic barycenter M (close to the center of space R) remains in fixed position. As a matter of fact it has been found that, in most of the aircrafts, this barycenter moves very little.

FIG. 2 shows an embodiment of a magnetometer according to the present invention and bringing into play the electronic pumping referred to in the U.S. Patent No. 3,049,661.

The magnetometer illustrated by FIG. 2 comprises two magnetic resonance generators $1a$ and $1b$, $1a$ being located at A and $1b$ at B, said generators being capable of delivering two voltages of respective frequencies $f'$ and $f''$ equal to the Larmor frequency for two subatomic particles, in particular two atomic nuclei, having different respective gyromagnetic ratios $\gamma'$ and $\gamma''$.

Each of the magnetic resonance generators $1a$, $1b$ comprises a vessel $2a$, $2b$ containing a solution $3a$, $3b$ which comprises, on the one hand, a solvent containing atomic nuclei (different for the two vessels) having a magnetic moment and a kinetic momentum both different from zero and, consequently a well determined gyromagnetic ratio, and on the other hand, dissolved in this solvent, a paramagnetic free radical having a relatively high resonance frequency in a zero magnetic field and a dipolar coupling between the spins of the unpaired electrons of the free radical and the spins of the atomic nuclei of the solvent, saturation of an electronic resonance line of such a radical increasing, in accordance with the Overhauser-Abragam effect, the intensity of the signal, at the Larmor frequency of the atomic nuclei.

By way of example, vessel 2a contains a solution 3a of 200 cm.³ of water containing in solution 0.5 g. of peroxylamine sulfate $(SO_3)_2NOK_2$, the resonance frequency of which in a zero field averages 56 mHz., whereas vessel 2b contains a solution 3b of 200 cm.³ of $C_6H_4(CF_3)_2$, in the meta form, saturated with peroxylamine sulfate.

The two vessels 2a, 2b are located at a distance $a$ (preferably small) from each other, this distance being preferably adjustable, for instance by displacement of at least one of the vessels along a rod 2 and the line of electronic resonance at 56 mHz. of the Fremy $$(SO_3)_2NOK_2$$

contained in each of the vessels, is saturated by means of a coil 4a, 4b disposed in said vessel and fed with current through a coaxial cable 5 from a high frequency oscillator or generator 6 delivering a sinusoidal voltage of a frequency equal to 56 mHz., the power consumed by the oscillator being for instance of the order of one watt.

Owing to the saturation of the electronic resonance line at 56 mHz. of $(SO_3)_2NOK_2$, the magnetic resonance signal of the protons of solution 3a, on the one hand, and of the fluorine nuclei of solution 3b, on the other hand, in the magnetic field H existing in the zone 7 occupied by vessels 2a and 2b, has an intensity increased by the Overhauser-Abragam effect.

The signal at the Larmor frequency in each vessel 2a and 2b is detected by means of an arrangement of the spin oscillator type.

Each of these arrangements comprises two coils 8a, 8b and 9a, 9b which surround the corresponding vessel and which may include for instance 6,000 and 200 turns, respectively. Between the outer coils 8a, 8b and 9a, 9b, on the one hand, and the inner coils 4a, 4b, on the other hand, there is provided an electric screen (not shown) of a known type practically impermeable to the electromagnetic radiation at 56 mHz. but permeable to the magnetic resonance radiation at frequency

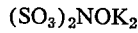

$$f' = \frac{\gamma'}{2\pi} \cdot H \text{ and } f'' = \frac{\gamma''}{2\pi} \cdot H$$

respectively.

It is only for the sake of clarity that coils 8a, 8b and 9a, 9b have been shown on the outside of vessel 2a, 2b.

Across the terminals of each of coils 8a, 8b, there is mounted a capacitor 10a, 10b, each system 8a–10a and 8b–10b constituting a resonating circuit tuned to the Larmor frequency $f'$ and $f''$, respectively.

Each coil 8a, 8b is connected with a linear amplifier 11a, 11b without phase distortion, this amplifier being preferably a selective amplifier with a narrow passband centered on $f'$ or $f''$, respectively. In this case, the selectivity of the resonating circuit (the figure of merit of which may be of the order of from 4 to 6 so as to reduce pulling) and of the amplifier eliminates most of the background noise and consequently increases the signal to noise ratio.

Amplifier 11a, 11b, which may have a gain of the order of 70 decibels, has its output connected, through a resistor 13a, 13b (having a high ohmic impedance with respect to the self impedance of 9a, 9b, for instance of the order of 100,000 ohms), to coil 9a, 9b. The middle points of coils 8a, 8b and 9a, 9b and of amplifier 11a, 11b in every branch are grounded.

The axes of coils 8a, 8b and 9a, 9b are perpendicular to each other, in such manner as to ensure an electric uncoupling between every coil pair 8a–9a and 8b–9b. The residual coupling is reduced to a minimum by means of a balancing potentiometer 14a, 14b of 25,000 ohms. In these conditions of uncoupling, only the nuclear resonance phenomenon can couple coils 8a–9a, on the one hand, and 8b–9b on the other hand. When coil 8a, 8b is the seat of an alternating nuclear induction electromotive force at the Larmor frequency corresponding to the magnetic field H equal to $H_0+h_A$ or $H_0+h_B$) and to the gyromagnetic ratio $\gamma'$ or $\gamma''$ respectively, this electromagnetic force is amplified by amplifier 11a, 11b, then applied to coil 9a, 9b the magnetic field of which ensures the permanency of this electromotive force, which sustains the oscillations. It may be said that system 8a–11b–9a with vessel 2a, on the one hand, and 8b–11b–9b with vessel 2b, on the other hand, constitute a quantic oscillator corresponding to a conventional reaction oscillator wherein the nuclear resonance curve plays the same part as the oscillating circuit curve in conventional oscillators. As coupling takes place at the Larmor frequency, the oscillator oscillates at this frequency.

To sum up, if it were supposed that $H=0$, no current would flow through amplifier 11a, 11b due to the uncoupling between coils 8a–9a, 8b–9b. On the contrary, when it is different from zero, the magnetic moments of the hydrogen nuclei of solution 3a and of the fluorine nuclei of solution 3b undergo a precession at the Larmor frequency and each generator or nuclear oscillator 1a, 1b, in particular each amplifier 11a, 11b, supplies a voltage of a frequency equal to said Larmor frequency, that is to say $f'$ for 11a and $f''$ for 11b.

A mixer 15 receives the voltages, of respective frequencies equal to $f'$ and $f''$, delivered by outputs 12a and 12b and it delivers, at its output 24, a signal having the following frequencies: $f'$, $f''$, $f'+f''$ and $f'-f''$. A passband filter 16 permits only the passage of frequency $f'-f''$ (when $\gamma'$ and $\gamma''$ are positive as in the example that has been chosen) on which its passing band is centered.

According to relation 5, the frequency $f'''$ of the voltage at the output of filter 16 is exactly proportional to the intensity $H_0$ of the magnetic field to be measured in zone 7 and independent of $\omega$. Furthermore, according to the invention, when condition 8 is compiled with, $f'''$ is independent of the permanent parasitic magnetic fields $h_A$ at A and $h_B$ at B.

Frequency $f'''$ is measured in a frequency meter 17 of a known type and the value of this frequency is recorded by means of a recorder 18.

In the example that has been chosen and when measuring the intensity H (of the order of 0.5 gauss) of the earth magnetic field: $f'=2100$ Hz., $f''=1975$ Hz. and $f'''=125$ Hz., approximately.

In a modification of the arrangement of FIG. 2, vessel 2a might contain a solution of $(SO_3)_2NOK_2$ saturated with sodium metaphosphate, the second particle being in this case phosphorus. Only the tuning frequencies $f''$ and $f'''$ are different.

Measurement of the frequency is, as in the prior patent application, relatively delicate if it is desired to obtain a high accuracy, because this frequency is relatively low (it is a frequency difference: $f'''=f'-f''$ which is of the order of 125 mHz. for the earth magnetic field at the latitude of France when the atomic nuclei are protons, on the one hand, and fluorine nuclei, on the other hand).

In order to measure such a low frequency, it is particularly advantageous to make use of the frequency meter for low frequencies disclosed in the patent application filed in the United States by Antoine Salvi under Ser. No. 543,967 on Apr. 20, 1966 and assigned to the same assignee as the present application.

Although the invention has been illustrated in the case where two spin oscillators are brought into play, in particular with protons, on the one hand, and phosphorus or fluorine nuclei on the other hand, the invention may also be performed, with the same particles, with other kinds of magnetic resonance generators, for instance with generators of the maser type described in the U.S. Patent No. 3,049,661, or with free precession generators described in the U.S. Patent No. 3,133,243, both of these types of generators advantageously using the Overhauser-Abragam effect.

On the other hand, it has been indicated above, by way of example of a paramagnetic free radical solution (that is to say having an unpaired electron) used in vessels 2a and 2b, to use a solution of $(SO_3)_2NOK_2$. Instead of such a solution, it would be possible to use solutions of diphenylpicrylhydrazyl or of a free radical including a nitroxide radical wherein the nitrogen atom is linked on the other hand exclusively to two carbon atoms each linked to three other carbon atoms (of the type described in the Belgian Patent No. 514,472). Of course, the saturation frequency of the electronic resonance line, which is 56 mHz. in the case of $(SO_3)_2NOK_2$, varies from a paramagnetic free radical to another one.

Finally, in the case where one of the systems of subatomic particles consists of a system of helium 3 nuclei, the Larmor frequency generator corresponding to these nuclei advantageously consists of an optical pumping generator of the type described by L. D. Schearer in "Advances in Quantum Electronics," pp. 239 to 251 (edited by J. R. Singer, Columbia University Press, New York and London, 1961).

The invention is therefore concerned with a magnetic resonance magnetometer having over the prior magnetometer many advantages and in particular the following ones:

First, its measurements are independent of the rotations of the magneometer with respect to the direction of the magnetic field to be measured.

Its measurements are also independent of the permanent parasitic magnetic fields resulting from the permanent magnetization and the currents feeding the apparatus on board of the aircraft.

The measurements are absolute if compensation is also performed for the other disturbances on board of the aircraft (fields induced by the earth magnetic field in the ferromagnetic materials, transient fields appearing on the closing or opening of an electric circuit on board the aircraft and fields induced by the Foucault currents) through the known conventional means.

The magnetometer according to the present invention permits automatic recording of the variations of the absolute value of the earth magnetic field.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. For use on a movable body fitted with electrical apparatus which produces a permanent parasitic magnetic field the intensity of which varies from one point to another on said movable body, a magnetic resonance magnetometer which comprises, in combination, two probes carried by said movable body and each respectively including subatomic particles of a given kind having a non zero magnetic moment and a non zero kinetic momentum, the two respective kinds being different from each other and having different respective gyromagnetic ratios, means for producing and detecting the magnetic resonance of said kinds of particles in each of said probes, means for measuring the respective magnetic resonance frequencies of said two kinds of particles, respectively, and means for measuring the algebraic difference of said respective magnetic resonance frequencies, said two probes being located on said body in two respective spaced positions such that the product of the intensity of said permanent parasitic magnetic field in one of said two positions by the gyromagnetic ratio of the particles of the probe located in said position is substantially the same as the product of the intensity of said permanent parasitic magnetic field in the other of said two positions by the gyromagnetic ratio of the particles of the probe located in said other position.

2. A magnetometer according to claim 1, for use on a movable body consisting of an aircraft wherein the probe including the subatomic particles of higher gyromagnetic ratio is disposed in the tail end of the aircraft and the other probe is located at a small distance from the first one, between it and the nose of the aircraft.

References Cited
UNITED STATES PATENTS

| | | | |
|---|---|---|---|
| 3,049,661 | 8/1962 | Abragam | 324—.5 |
| 3,133,243 | 5/1964 | Bonnet | 324—.5 |
| 3,249,856 | 5/1966 | Lemaire | 324—.5 |

ARCHIE R. BORCHELT, *Primary Examiner.*

M. J. LYNCH, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,326            September 24, 1968

Antoine Salvi et al.

It is certified that error appears in the above identified patent and that said Letters Patent are hereby corrected as shown below:

In the heading to the printed specification, after line 7, insert -- Claims priority, application France, Feb. 4, 1966, 48,472 --.

Signed and sealed this 24th day of February 1970.

(SEAL)
Attest:

Edward M. Fletcher, Jr.
Attesting Officer

WILLIAM E. SCHUYLER, JR.
Commissioner of Patents